(12) United States Patent
Puchtler

(10) Patent No.: US 9,146,110 B2
(45) Date of Patent: Sep. 29, 2015

(54) PROVISION OF DATABASE OBJECTS FOR DESTINATION SEARCH BY A NAVIGATION DEVICE

(75) Inventor: Stephan Puchtler, Eckental (DE)

(73) Assignee: Elektrobit Automotive GmbH, Erlangen (DE)

( * ) Notice: Subject to any disclaimer, the term of this patent is extended or adjusted under 35 U.S.C. 154(b) by 116 days.

(21) Appl. No.: 13/807,749

(22) PCT Filed: Jul. 2, 2010

(86) PCT No.: PCT/EP2010/004000
§ 371 (c)(1),
(2), (4) Date: Mar. 5, 2013

(87) PCT Pub. No.: WO2012/000530
PCT Pub. Date: Jan. 5, 2012

(65) Prior Publication Data
US 2013/0204529 A1    Aug. 8, 2013

(51) Int. Cl.
*G01C 21/00*    (2006.01)
*G01C 21/32*    (2006.01)
*G06F 17/30*    (2006.01)
*G09B 29/10*    (2006.01)

(52) U.S. Cl.
CPC ............... *G01C 21/00* (2013.01); *G01C 21/32* (2013.01); *G06F 17/30241* (2013.01); *G09B 29/10* (2013.01)

(58) Field of Classification Search
CPC ........ G01C 21/32; G01C 21/00; G09B 29/10; G06F 17/30241
USPC ........................................... 701/533
See application file for complete search history.

(56) References Cited

U.S. PATENT DOCUMENTS

2002/0133289 A1    9/2002  Miyaki
2007/0112510 A1*   5/2007  Ogawa ........................ 701/209
2009/0119007 A1    5/2009  Murayama et al.

OTHER PUBLICATIONS

International Search Report issued in corresponding application No. PCT/EP2010/004000 mailed Jun. 8, 2011.

* cited by examiner

*Primary Examiner* — Mary Cheung
*Assistant Examiner* — Yuen Wong
(74) *Attorney, Agent, or Firm* — Carter, DeLuca, Farrell & Schmidt, LLP

(57) ABSTRACT

A technique for providing addressable database objects for route guidance by a navigation device to geographical areas is provided. A method implementation of this technique comprises providing a map database comprising at least area objects, wherein each area object is associated with an area name and a polygon representative of a geographical area, retrieving at least one area object from the map database, determining, based on the polygon associated with the retrieved area object, at least one destination point for route guidance to the geographical area, generating a point object comprising the area name associated with the retrieved area object and the at least one destination point, and making the first point object, or a database object derived therefrom, available for being addressed by the area name during a destination search.

18 Claims, 8 Drawing Sheets

| Destination | Type | Form | Additional information |
|---|---|---|---|
| | | | |
| Erlangen | City | Point / Polygon | |
| Am Wolfsmantel | Street | Point / Multipoint | |
| Frauenkirche | POI | Point | |
| Brombachsee | Lake | Polygon | |
| | | | |

Fig. 4

| POINT OBJECT | |
|---|---|
| Name | Am Wolfsmantel |
| Type | Street |
| Form | Point/Multiple Points |
| Additional Info | |

Fig. 5A

| AREA OBJECT | |
|---|---|
| Name | Brombachsee |
| Type | Lake |
| Form | Polygon |
| Additional Info | |

Fig. 5B

| POINT OBJECT | |
|---|---|
| Name | Brombachsee |
| Type | Lake |
| Form | Polygon |
| Area/POI Type | Lake |
| Access Points (AP) | AP Data |
| Children POI | Links to POIs (per AP) |
| Centre of Area | Centre Data |
| Additional Info | |

Fig. 5C

PROVISION OF DATABASE OBJECTS FOR DESTINATION SEARCH BY A NAVIGATION DEVICE

TECHNICAL FIELD

The present disclosure generally relates to navigation. In particular, a technique for generating database objects that are addressable during a destination search by a navigation device is provided.

BACKGROUND

Conventional navigation devices have a destinations database with addressable destination objects representative of cities and ZIP codes. The devices further provide a user interface for searching the destinations database. FIG. 1 illustrates such a user interface in the exemplary form of a Graphical User Interface (GUI) 10 displayed on a touch screen of a navigation device.

When searching for a particular city as destination for route guidance, a user operating the navigation device inputs the city name via a keyboard 20 presented on the GUI 10. The letters input by the user are displayed in a display line 30, and the navigation device performs a background search to present city names including the letter sequence input thus far on a display section 40 for user selection. As an alternative to a city name, the ZIP code of a city may be entered as well during the destination search.

In addition to city destinations, modern navigation devices also offer so-called Points Of Interest (POIs) and user programmed target points as destinations for route calculation and route guidance. POIs (e.g., particular sights, restaurants, gas stations, and so on) can be searched and selected in the same manner described above by entering letters via the keyboard 20. User programmed target points can be input via their geographical coordinates or by marking them for example on a map displayed on the touch screen.

It has been found that it is currently not possible to search for all graphical objects typically presented during route guidance on a navigation screen of the navigation device. For example, while certain geographical areas such as woods, lakes, states and seas along a guided route are visually displayed by the navigation device, the user can presently not search for a specific geographical area such as "Loch Ness" or "Blackwood Forest" as destination using, for example, the GUI 10 illustrated in FIG. 1. Rather, the user has to search for a city (that needs to be known to him or her) in the vicinity of the area of interest. Alternatively, the user has to explicitly mark the area of interest as destination point on a map displayed on the touch screen. Both approaches can get time-consuming and error-prone.

SUMMARY

There is a need to facilitate the search for area destinations by a navigation device.

According to a first aspect, a method of providing addressable database objects for route calculation (including route guidance and route planning) by a navigation device to geographical areas is presented. The method comprises providing a map database comprising at least area objects, wherein each area object is associated with an area name and a polygon representative of a geographical area, retrieving at least one area object from the map database, determining, based on the polygon associated with the retrieved area object, at least one destination point for route guidance to the geographical area, generating a first point object comprising the area name associated with the retrieved area object and the least one destination point, and making the first point object, or a database object derived therefrom, available for being addressed by the area name during a destination search.

The method may be performed during a map data compilation process or separate therefrom. Moreover, the method may be performed either on-board or off-board with respect to the navigation device. In an off-board scenario, the first point object, or any database object derived therefrom, may be transferred to the navigation device. The transfer may occur via a memory card or stick, a network or computer connection, or in any other way) either during production of the navigation device or after production (e.g., by a user of the navigation device).

The first point object may be made available for being addressed during a name-based destination search in various ways. As an example, the point object may be stored (e.g., as POI object) in the map database. Additionally, or in the alternative, the first point object may be processed to generate a destination object to be stored in a destinations database intended for the navigation device. Processing of the first point object may, for example, be performed in the context of a map data compilation process during which for point objects stored in the map database destination objects for the destinations database are derived.

An area object in the map database may comprise classifying information. The classifying information may simply differentiate the area object from other objects (e.g., point objects) stored in the database. Additionally, or in the alternative, the classifying information may allow to differentiate between different area object types (e.g., lake, wood, sea, country, etc.). In the case the area objects in the map database comprise classifying information, the retrieving step may comprise identifying one or more area objects to be retrieved based on their associated classifying information. As an example, the retrieving step may be performed (only) for area objects in a map database also comprising point objects, or (only) for specific area object types in the map database. The classifying information of a particular area object (or information derived from this classifying information) may also be included in the first point object or any database object (such as a destination object) derived therefrom.

In one implementation, each polygon is defined by edges. The edges may indicate starting points and end points of bounding lines that constitute a particular polygon. As an example, the edges may be indicated by geographical coordinates.

The at least one destination point of the first point object may be determined based on at least one edge of the polygon of the associated retrieved area object. In the simplest case, the at least one destination point is determined to correspond to at least one edge of the polygon of the associated area object. In more sophisticated implementations, at least one edge may form the basis for determining another point (e.g., of a second point object in the map database) that is then selected as the at least one destination point for the point object.

The edges associated with the retrieved area object may be analysed to determine, based on the edges, at least one access point to the geographical area for best route calculation. For the particular geographical area represented by the first point object, multiple access points may be determined on spaced apart locations (e.g., on various sides) of the associated polygon such that there will be a suitable access point from any desired direction for best route calculation by the navigation device. In one configuration, the access points are determined to correspond to the polygon edges or a subset thereof.

The edges of the polygon of the retrieved area object may be thinned out in such a manner that edges essentially defining the shape of the polygon are maintained. This thinning-out, or filtering, may reduce the polygon edges to a manageable number. The at least one destination point and/or at least one access point may then be determined based on the thinned-out edges.

The first point object, or any database object desired therefrom, may further comprise information pertaining to at least one of the edges and/or to the at least one access point. As an example, the corresponding geographical coordinates may be stored by or linked to the first point object or any database object derived therefrom. Moreover, as mentioned above, at least one of the edges and/or the at least one access point may be determined as the at least one destination point.

In addition to the area objects and, optionally, their associated first point objects, the map database may further comprise second point objects. A second point object may be defined by at least one destination point and a destination name. As an example, the second point objects may be representative of cities (defined, for example, by a single destination point) or of streets (typically defined by a sequence or sequences of destination points). Still further, a second point object could be a POI object defined by one or multiple destination points.

In the case the map database further comprises second point objects, at least one second point object may be determined based on the polygon associated with the retrieved area object. The at least one second point object thus determined may then be linked with the first point object, or any database object derived therefrom. The linking may be performed such that for a given object, one or more associated second point objects can be determined (e.g., looked-up). This linking may be exploited in various ways. For example, in case a user of the navigation device wishes to navigate to the area represented by the first point object, the navigation device may present one or more associated second point objects or database objects derived from the associated second point objects (e.g., as alternative or additional destinations).

Additionally, or in the alternative, the at least one destination point of the first point object may be determined based on the at least one destination point of the second point object. In the simplest manner, the destination point of the first point object may be determined to correspond to the destination point of the second point object. In more sophisticated implementations, the at least one destination point of the second point object is processed further to derive the at least one destination point of the first point object.

The at least one second point object may be determined in various ways based on the polygon associated with the retrieved area object. As an example, the second point object may be determined by applying a distance-based criterion with respect to the polygon. As an example, one or more second point objects within a predefined distance from a given polygon edge (e.g., from an access point) may be determined. In this implementation, all second point objects thus determined may specifically be linked to the corresponding polygon edge.

According to a further aspect, a computer program product is provided which comprises program code portions for performing the steps of any of the methods and method aspects described herein when the computer program product is executed on one or more computing devices, such as a navigation device. The computer program product may be stored on a computer-readable recording medium, such as a permanent or re-writable memory within or associated with the computing device, a CD-ROM, DVD, and so on. The computer program product may also be provided for download to the computing device, for example via a data network such as the Internet and/or a communication connection such as a telephone line or a wireless link.

According to a still further aspect, an apparatus for providing addressable database objects for route calculation by a navigation device to geographical areas is presented. The apparatus comprises a processor and an interface to a map database comprising at least area objects, wherein each area object is associated with an area name and a polygon representative of a geographical area. The processor is adapted to retrieve at least one area object from the map database, to determine, based on the polygon associated with the retrieved area object, at least one destination point for route guidance to the geographical area, to generate a point object comprising the area name of the retrieved area object and the at least one destination point, and to make the point object, or a database object derived therefrom, available for being addressed by the area name during a destination search.

The apparatus may be part of a navigation device or may be provided separate from a navigation device. The navigation device may further comprise a destinations database with destination objects corresponding to the point objects made available by the processor. The navigation device may be realized as a portable (e.g., handheld) device or as a device fixedly installed, for example, in a vehicle.

BRIEF DESCRIPTION OF THE DRAWINGS

Further aspects and advantages of the technique presented herein will become apparent from the following description of a preferred embodiment in conjunction with the drawings, wherein:

FIG. 4 shows an embodiment of the structure of a map database;

FIG. 5A to 5C show embodiments of various map database objects;

DETAILED DESCRIPTION

In the following description, for purposes of explanation and not limitation, specific details are set forth to provide a thorough understanding of the present disclosure. It will be apparent to one skilled in the art that the technique disclosed herein may be practiced in other embodiments that depart from these specific details. For example, while the following embodiment will primarily be described with reference to a map compilation process performed by a navigation device, the skilled artisan will appreciate that the map compilation process may also be performed off-board. Still further, while the following embodiment will be described with respect to specific area types, database configurations and database objects, it will be appreciated that the technique presented herein can also be embodied in other area types, other database configurations and other database object structures.

Those skilled in the art will further appreciate that the functions explained herein can be implemented using individual hardware circuitry, using software functioning in conjunction with a programmed microprocessor or general purpose computer, using an Application Specific Integrated Circuit (ASIC) or using one or more Digital Signal Processors (DSPs). It will also be appreciated that the technique described herein can be embodied in a microprocessor and a memory coupled to the microprocessor, wherein the memory is encoded with one or more programs that perform the method and method aspects disclosed herein when executed by the processor.

Figure 2:
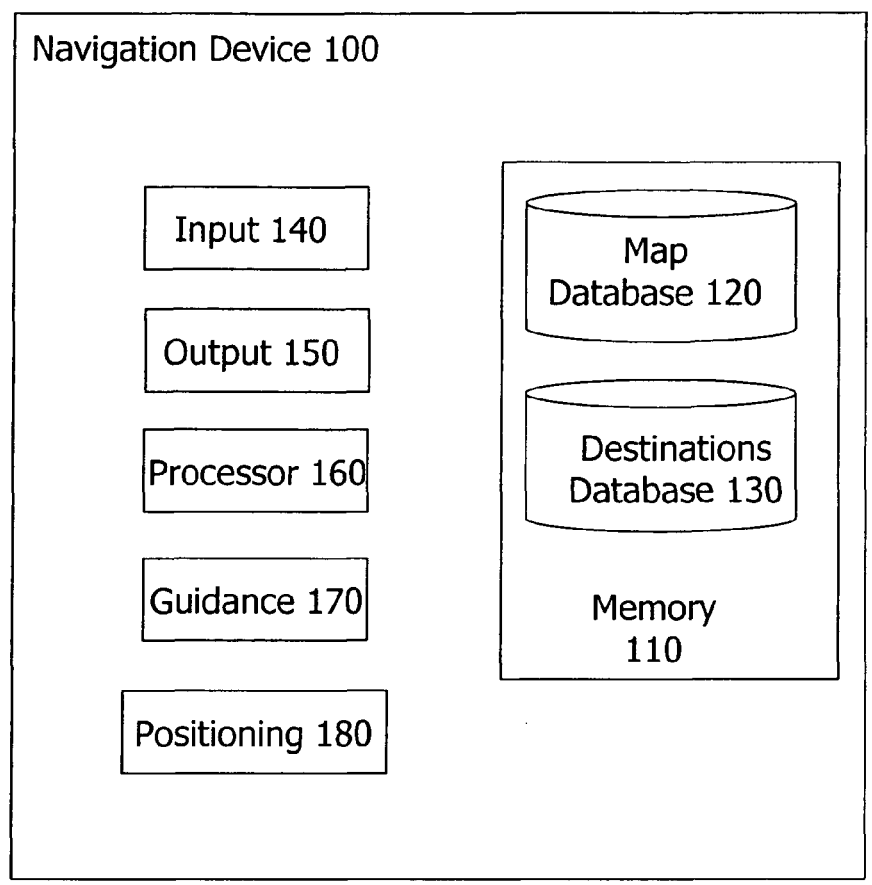
FIG. 2 shows a block diagram of an apparatus embodiment of the present invention.

FIG. 2 illustrates an embodiment of an apparatus for providing addressable database objects for route calculation to geographical areas. The apparatus embodiment of FIG. 2 is realized in the form of a personal or vehicular navigation device 100.

As illustrated in FIG. 2, the navigation device 100 comprises a memory 110 with a map database 120 and a destinations database 130. It should be noted that the databases 120, 130 can be realized, depending on the particular needs, either in a simple form (e.g., as tables) or in more sophisticated configurations (e.g., based on a database management system). The memory 110 further comprises memory portions for storing program code controlling the operation and functions of the navigation device 100.

Figure 1:
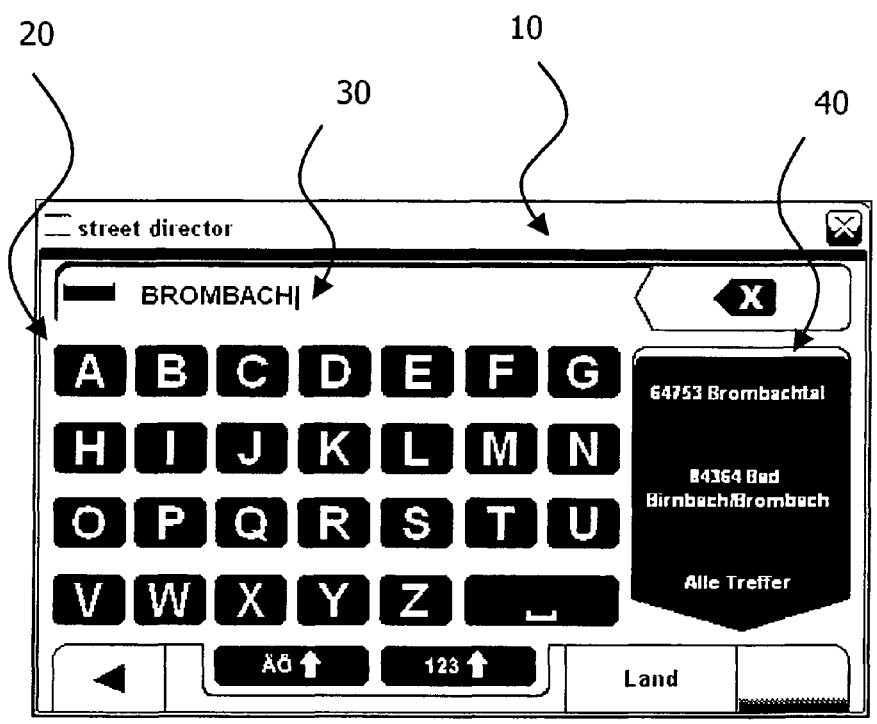
FIG. 1 illustrates a GUI of an existing navigation device.

The navigation device 100 also comprises an input component 140 and an output component 150. The I/O components 140, 150 can be realized as separate components or can be integrated into a single component such as a touch screen similar to the one described above with reference to FIG. 1.

Still further, a processor 160 is provided that is adapted to control the operation of the navigation device 100 in accordance with the method and method aspects described herein based on program code stored in memory 110. The processor 160 has access to the memory 110 in general and the databases 120, 130 in particular via a memory interface not shown in FIG. 2. It should be noted that the map database 120 could also be located off-board the navigation device 100. In such a case, the processor 160 may be provided with access to the external map database 120 via a data interface conforming, for example, to the Universal Serial Bus (USB) standard.

A guidance component 170 of the navigation device is configured to calculate routes and perform route guidance based on information contained in the map database 120, information contained in the destinations database 130 as well as information received from a satellite-based positioning component 180. The positioning component 180 comprises a positioning sensor (e.g., a Global Positioning System, GPS, sensor).

Figure 3:
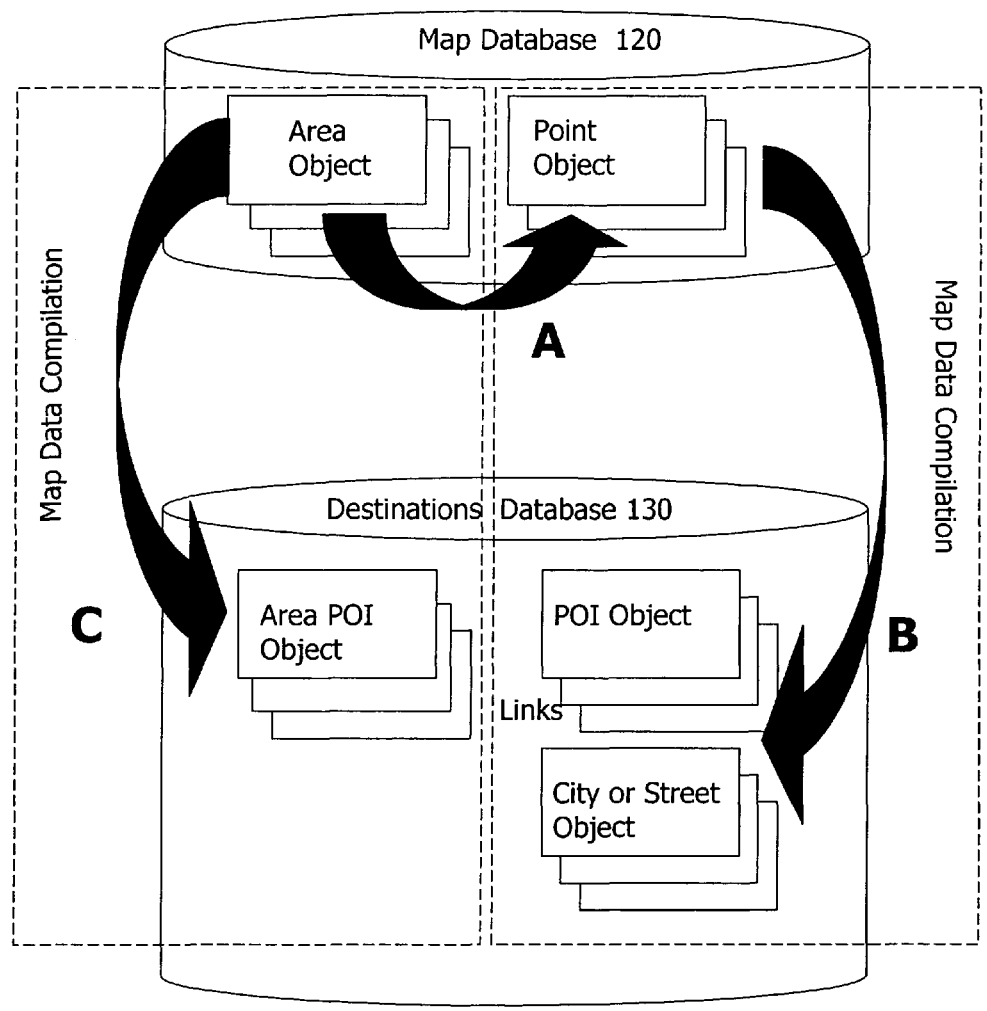
FIG. 3 illustrates an embodiment of a database configuration of the device of FIG. 2.

The various database objects (e.g., data sets) stored in the map database 120 and the destinations database 130 will now be described in more detail with reference to FIGS. 3, 4, 5A and 5B. It will be assumed that the map database 120 has a general structure as illustrated in FIGS. 3 and 4. That is, the map database 120 comprises database objects defining individual areas ("area objects") as well as database objects defining individual points or point sequences ("point objects").

FIG. 5A illustrates an exemplary point object generated for a particular street. The point object comprises various items of information, including an object name ("Am Wolfsmantel"), an object type ("Street"), an object form ("Point/multiple Points") as well as additional information. The additional information pertains, for example, to the geographical coordinates of the point/the multiple points defining the course of a street.

In addition to point objects, the map database 120 further comprises area objects as illustrated in FIG. 5B. Each area object comprises a plurality of items of information similar to a point object. As shown for the exemplary area object of FIG. 5B, each area object comprises an object name ("Brombachsee"), an object type ("Lake"), an object form ("Polygon") as well as additional information pertaining, for example, to the edges (e.g., their geographical coordinates) defining the polygon.

The main difference between point objects (e.g., of object type "City", "Street", and "POI" as shown in FIG. 4) on the one hand and area objects (e.g., of object type "Lake" as shown in FIG. 4 or object types "Wood", "Sea", etc.) on the other is the fact that during map data compilation, destination objects are created only for the point objects in the map database 120, while no such destinations objects will be generated for the area objects. Generally, the destinations objects in the destinations database 130 have an object format that can be searched during a name search using, for example, the user interface illustrated in FIG. 1. For a specific destination object found during the name search and selected by the user, one or more associated destination points (typically their geographical coordinates) can then be determined by the navigation device 100 and used for route calculation.

Figure 6:
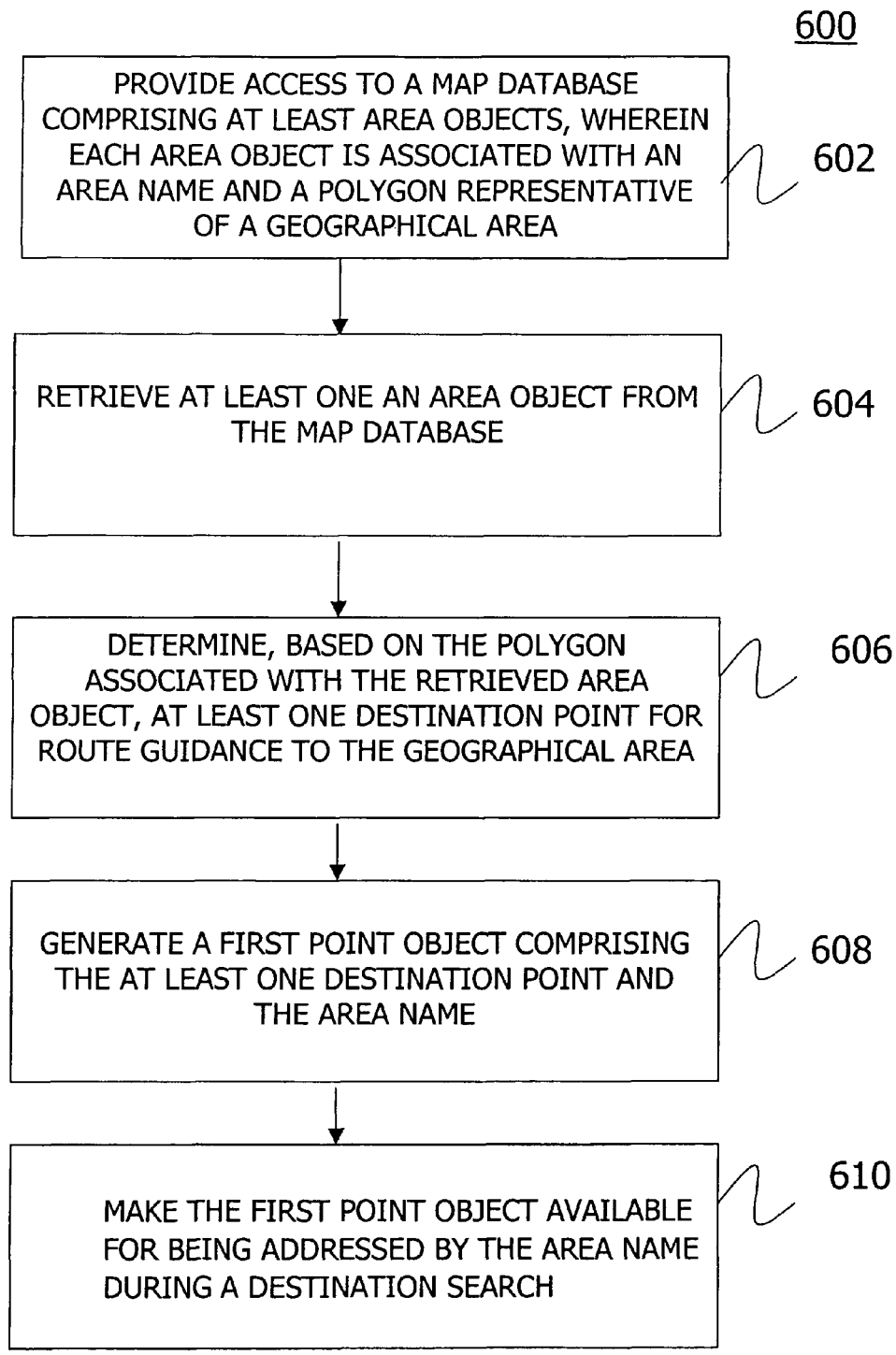
FIG. 6 shows a method embodiment of the present invention.

In the following, a method embodiment of providing addressable database objects for route calculation by the navigation device 100 of FIG. 2 will be described with reference to the flow diagram 600 of FIG. 6. It should be noted that the method embodiment could also be performed by any other apparatus that need not necessarily comprise navigation functionalities (i.e., off-board the navigation device 100).

The method steps discussed below can be executed by the processor 160 during a map data compilation process. The steps are based on detecting area objects in the map database 120, compiling the area objects and introducing the compiled area objects, or destination objects derived therefrom, into a so-called "geocoder" memory block.

In an initial step 602, the processor 160 is provided with access to the map database 120 comprising area objects and point objects as discussed above with reference to FIGS. 3, 4, 5A and 5B. Each area object is associated with an area name (e.g., "Brombachsee") and a polygon representative of the geographical area. In the map database 120, the polygon is defined by a set of geographical coordinates that define the boundary of the geographical area and that can be interpreted as edges spanning the associated polygon. Additionally, each area object is associated with an area type designation (e.g., "Lake"). In a similar manner, each point object is associated with a point type (e.g., "Street"), a point name (e.g., "Am Wolfsmantel"), and one or multiple geographical coordinates defining one or more associated destination points.

In a subsequent step 604, the processor 160 retrieves the area objects from the map database 120. The area objects may be selected by the processor 160 based on classifying information contained in the area objects that allows to differentiate the area objects from point objects (and that, optionally, allows to distinguish different types of area objects). In the present embodiment, the area type (e.g., "Lake") may be used as classifying information. It will be appreciated, however, that other items of information associated with the area objects could also be used for classifying purposes.

Once at least one area object of area type "Lake" has been retrieved from the map database 120, the processor 160 continues in step 606 with determining at least one destination point for route calculation from a given start point to the geographical area represented by the retrieved area object. This determination is based on the polygon associated with the retrieved area object as will now be described in more detail with reference to FIGS. 7 and 8.

Figure 7:
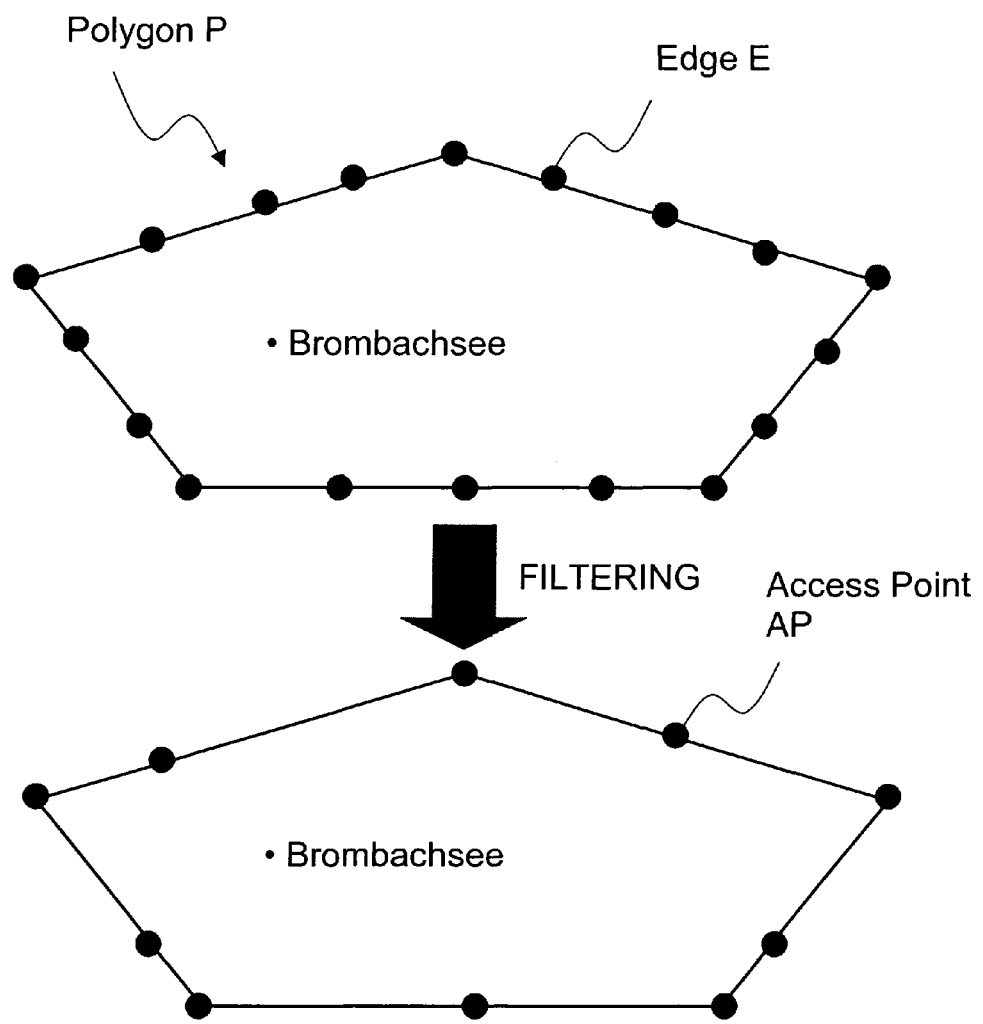
FIG. 7 illustrates an embodiment of thinning-out polygon edges that define a geographical area.

The upper portion of FIG. 7 illustrates for the retrieved area object the associated area name ("Brombachsee") and polygon (here a pentagon) P representative of the shape of the geographical area. The polygon P is defined in the map database 120 by a plurality of geographical coordinates representing polygon edges E. In their entirety, the edges span the polygon P and are thus representative of the shape of the geographical area underlying the retrieved area object.

Depending on the number of edges E defined for the polygon P in the map database 120 (relative to the size of the geographical area), it may be desireable to reduce the edges E to a manageable number for the subsequent processing steps. To this end, the edges of the polygon P may be thinned-out (or filtered) as illustrated in FIG. 7.

The thinning-out is performed in such a manner that edges E essentially defining the shape of the polygon P are maintained (as becomes apparent from a comparison of the original polygon illustrated in the upper portion of FIG. 7 and the thinned-out polygon illustrated in the lower portion of FIG. 7). Generally, the thinning-out is performed such that a sufficient number of edges E functioning as so-called access points APs is maintained. On the other hand, the thinning-out step can be omitted in case the original number of edges E already provides a desired number of access points APs. As understood herein, an access point AP represents geographical information that can be used by the navigation device 100 for best routes calculation from a given start point to the geographical area of interest. The start point may for example, be determined as the current location sensed by the geopositioning component 180.

Figure 8:
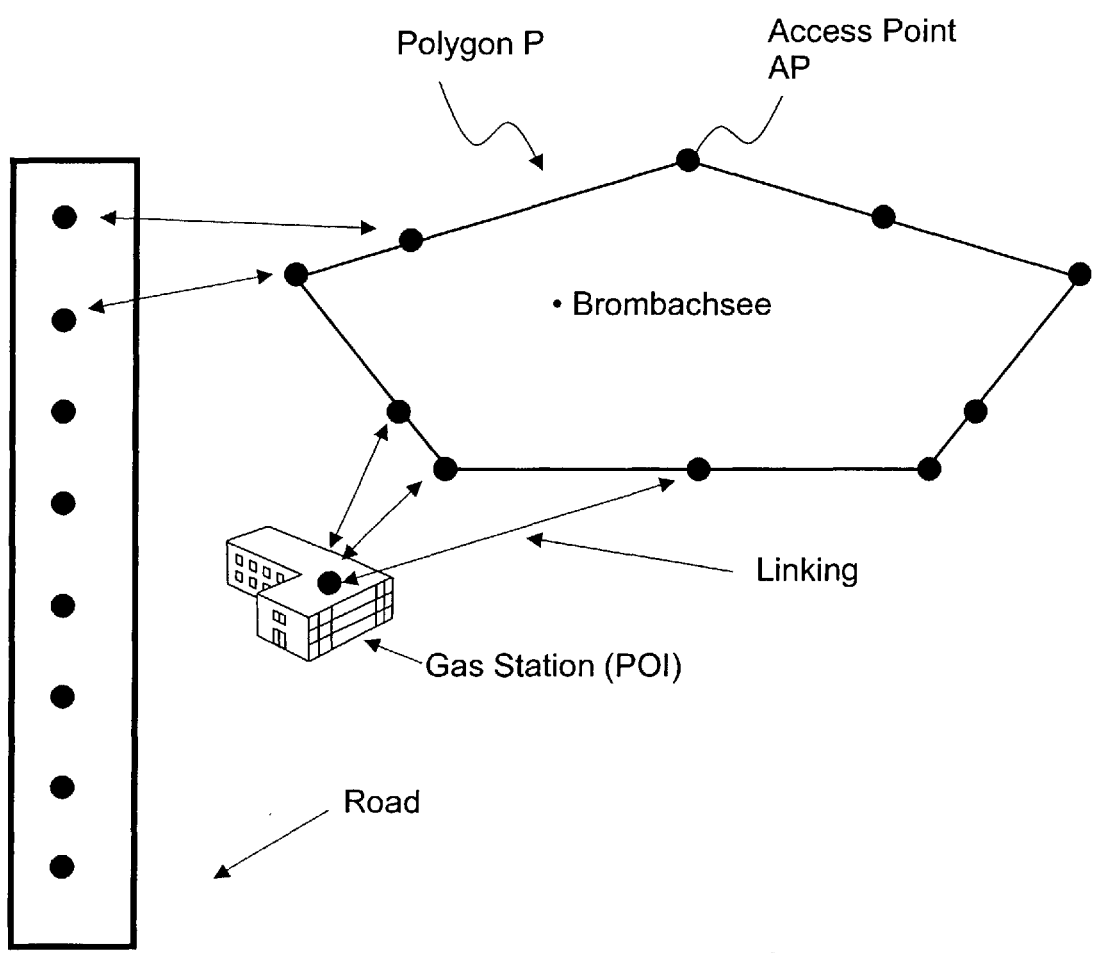
FIG. 8 illustrates an embodiment of linking point objects to polygon edges.

After the thinning-out process illustrated in FIG. 7, the processor 160 continues step 606 with selecting one or more point objects in the map database 120 for the particular area object retrieved from the map database 120. Specifically, as illustrated in FIG. 8, the processor 160 determines for each access point AP whether there exist any point objects within a predefined distance from this access point AP. The predefined distance may, for example, range between 1 to 20 km and optionally depends on the size of the geographical area of interest. The point objects may, for example, be representative of POIs, cities, streets (or street sections), and so on. The point objects thus determined for a particular access point AP may form the basis for determining at least one destination point for route calculation to the geographical area of interest. For example, the geographical coordinates of a selected point object may be defined as the destination point for the area object in general or one of its access points APs in particular.

As the access points APs are determined such that their geographical distribution still corresponds to the shape of the original polygon P, the guidance component 170 of the navigation device 100 may select a suitable access point AP to the geographical area based on the location of the start point (e.g., based on the direction from which the geographical area is to be approached). Instead of performing route calculation (or route guidance) between the start point and the selected access point AP, the guidance component 170 may also calculate a route from the start point to any POIs linked to the selected access point AP.

Once one or multiple destination points have been determined for the geographical area of interest in step 606, a point object comprising the particular destination point(s) and the area name associated with the retrieved area object is generated in step 608. The newly generated point object may have a structure as generally illustrated in FIG. 5C. The arrow stretching from FIG. 5B to 5C illustrates that the point object of FIG. 5C has been generated based on the area object of FIG. 5B.

As shown in FIG. 5C, the point object created for the particular area object of FIG. 5B comprises multiple items of information including object name, object type and object form. In addition to the items of information provided as for a "conventional" point object (like the one of FIG. 5A), the point objects generated from area objects comprise further data like the geographical coordinates of the access points APs, links to children "POIs" (e.g., POIs, streets and cities provided on an access point AP basis as illustrated in FIG. 8), data about the geographical centre of the area, and so on. The point object illustrated in FIG. 5C comprises two different types of destination points that may be utilized depending on the needs and settings by the guidance component 170. A first type of destination point is constituted by the access points APs (i.e., the filtered edges E), and a second type of destination point is provided by the geographical coordinates of the children POI linked to the access points APs.

In a final step 610, the point object generated in step 608 is made available (e.g., in the "geocoder" memory block and/or an associated index structure in the memory 110) for being addressed by the area name during a destination search. Generally, during the map compilation process for point objects, different destination object types (e.g., "City", "Street" or "POI") are created and added to the "geocoder" memory block (e.g., in the destinations database 130). Additionally, index structures for these objects are created to support a name search for these objects during a destination search. Here, destination objects are also created for area objects in the map database 120, and the result is added to the "geocoder" memory block in a similar manner as for point objects. In particular, index structures for a name search are also created for destination objects derived from area objects.

According to a first variant, the point object generated in step 608 is simply written as a "conventional" point object into the map database 120 (as illustrated in FIG. 3 by arrow A). According to this strategy, the resulting point object can simply be handled as a conventional point object when generating a destination object during map data compilation (arrow B). According to another variant, that may be combined with the first variant, the point object generated in step 608 is directly converted further into a destination object (area POI object) during map data compilation as illustrated by arrow C. According to both variants, the newly generated destination object is marked as representing a POI.

After the map data compilation process is concluded, a destination object in the destinations database 130 has been generated for each area object of the type "Lake" in the map database 120. Additionally, for each area object the area name has been entered into a name search index structure. As a result, these area objects have been integrated into the name search functionalities of the navigation device 100.

Figure 9:
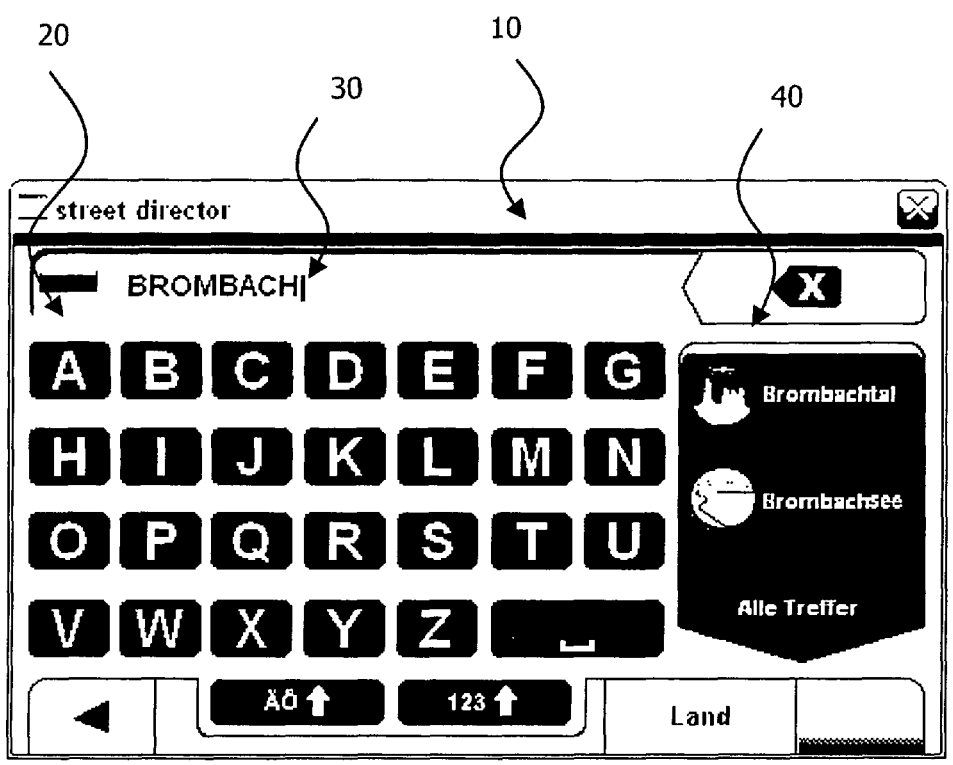
FIG. 9 illustrates an embodiment of a GUI that allows for a name search for destination areas.

Therefore, when requiring route guidance to a particular destination area, a user of the navigation device 100 may simply type the area name in a similar manner as a city name or ZIP code on the keyboard 20 (i.e., the input component 140) of the GUI 10 as illustrated in FIG. 9. However, in contrast to the conventional search results (see FIG. 1), the navigation system 100 now additionally retrieves and presents area destinations in the display section 40 for user selection. In other words, the display section 40 not only offers, for example, the city "Brombachtal" to a user that has typed "Brombach" in the display 30, but also the area destination "Brombachsee". The navigation device may include a functionality which restricts user input on the keyboard 20 to letters actually occurring in the city names that have been selected thus far.

As the destination objects have inherited the area type field from their associated point objects, it is further possible to supplement a presentation of the area name in the display section 40 with an icon indicative of the presented area type. As, in the embodiment of FIG. 9, the destination "Brombachsee" is a geographical area of the type "Lake", an icon indicative of a lake may be presented in the display section 40 together with the area name "Brombachsee". Similar icons may be defined for woods, seas, and so on.

In one implementation, the GUI 10 permits for a specific area destination (e.g., the area destination currently presented in the display section 40) a selection whether route calculation shall be based on a particular access point AP (e.g., the best access point AP with respect to a given start point) of the area destination or any children POI (e.g., of type POI, street or city) directly linked with the area object (see FIGS. 5C and 8).

Once a user has selected a particular area destination, related access point AP or linked children POI by touching the corresponding proposal on the display section 40 of the touch screen, the guidance component 170 determines the appropriate destination point, calculates an optimal route to the destination point and offers conventional guiding functionalities. As has been explained above, route calculation may be based on either an access point AP suitably selected by the guidance component 170 or a children POI as destination point.

As has become apparent from the above embodiment, the technique presented herein extends the functionalities of conventional navigation devices by providing additional target destinations for user selection. The user may select for area destinations in a similar manner as for cities by simply entering the name of an area of interest in the conventional search window.

While the technique presented herein has been described in relation to an exemplary embodiment, it is to be understood that this description is for illustrative purposes only. Accordingly, it is intended that the invention be limited only by the scope of the claims appended hereto.

The invention claimed is:

1. A method of generating addressable database objects for route calculation by a navigation device to geographical areas, the method being performed during a map data compilation process and comprising:
   providing, by an interface, during the map data compilation process, a map database including at least area objects, wherein each area object is associated with an area name and a polygon representative of a geographical area;
   retrieving, by a processor, during the map data compilation process, at least one area object from the map database;
   determining by the processor, during the map data compilation process and based on the polygon associated with the retrieved area object, at least one destination point for route guidance to the geographical area;
   generating, by the processor, during the map data compilation process, a first point object including the area name associated with the retrieved area object and the at least one destination point;
   making, by the processor, during the map data compilation process, the first point object, or any database object derived therefrom, a destination object for being addressed by the area name during a destination search;
   retrieving the at least one destination point expanded from the destination object during the destination search; and
   transmitting at least a portion of the destination object to the navigation device for display at a graphical interface on a display of the navigation device, wherein the at least one destination point is additionally represented with at least one corresponding graphic indicative of the at least one destination point.

2. The method of claim 1, wherein making the first point object available comprises marking the first point object as a Point Of Interest, or POI, for the navigation device.

3. The method of claim 1, wherein each area object in the map database comprises classifying information, and wherein retrieving the at least one area object comprises identifying the at least one area object to be retrieved based on its classifying information.

4. The method of claim 3, wherein the first point object, or any database object derived therefrom, further comprises the classifying information of its associated area object or information derived from the classifying information.

5. The method of claim 1, wherein each polygon is defined by edges, and wherein the at least one destination point is determined based on at least one edge of the polygon of the retrieved area object.

6. The method of claim 5, further comprising analyzing the edges associated with the retrieved area object to determine, based on the edges, at least one access point to the geographical area for best route calculation.

7. The method of claim 5, further comprising:
   thinning out the edges of the polygon of the retrieved area object, wherein edges essentially defining the shape of the polygon are maintained; and
   determining the at least one destination point and/or the at least one access point based on the thinned-out edges.

8. The method of claim 5, wherein the first point object, or any database object derived therefrom, further comprises information pertaining to at least one of the edges and/or to the at least one access point.

9. The method of claim 5, wherein at least one of the edges and/or the at least one access point is determined as the at least one destination point.

10. The method of claim 1, wherein the map database further comprises second point objects, wherein each second point object is associated with at least one destination point and a point name, and further comprising:
    determining, based on the polygon associated with the retrieved area object, at least one second point object; and
    linking the at least one second point object with the first point object.

11. The method of claim 10, wherein the at least one second point object is determined based on a distance-based criterion with respect to one of the edges of the retrieved area object.

12. The method of claim 1, wherein the map database further comprises second point objects, wherein a second point object is defined by at least one destination point and a point name, and further comprising
    determining, based on the polygon associated with the retrieved area object, at least one second point object; and
    determining the at least one destination point of the first point object based on the at least one destination point of the second point object.

13. The method of claim 12, wherein the at least one second point object is determined based on a distance-based criterion with respect to one of the edges of the retrieved area object.

14. The method of claim 1, wherein making the first point object the destination object comprises at least one of storing the first point object in the map database and processing the first point object to generate the destination object in a destinations database for the navigation device.

15. A non-transitory storage medium storing a computer program comprising program code portions for performing a method, when the computer program product is executed on one or more computing devices, the method being performed during a map data compilation process and comprising:
- providing, during the map data compilation process, a map database including at least area objects, wherein each area object is associated with an area name and a polygon representative of a geographical area;
- retrieving, during the map data compilation process, at least one area object from the map database;
- determining, during the map data compilation process and based on the polygon associated with the retrieved area object, at least one destination point for route guidance to the geographical area;
- generating, during the map data compilation process, a first point object including the area name associated with the retrieved area object and the at least one destination point;
- making, during the map data compilation process, the first point object, or any database object derived therefrom, a destination object for being addressed by the area name during a destination search;
- retrieving the at least one destination point expanded from the destination object during the destination search; and
- transmitting at least a portion of the destination object to the navigation device for display at a graphical user interface on a display of the navigation device, wherein the at least one destination point is additionally represented with at least one corresponding graphic indicative of the at least one destination point.

16. An apparatus configured to generate, during a map data compilation process, addressable database objects for route calculation by a navigation device to geographical areas, the apparatus comprising:
- an interface to a map database comprising at least area objects, wherein each area object is associated with an area name and a polygon representative of a geographical area; and
- a processor configured to:
- retrieve, during the map data compilation process, at least one area object from the map database;
- determine, during the map data compilation process and based on the polygon associated with the retrieved area object, at least one destination point for route guidance to the geographical area;
- generate, during the map data compilation process, a point object including the area name of the retrieved area object and the at least one destination point;
- make, during the map data compilation process, the point object, or a database object derived therefrom, a destination object for being addressed by the area name during a destination search; and
- transfer at least a portion of the destination object to the navigation device for being addressed during a destination search conducted on the navigation device, for retrieving the at least one destination point expanded from the destination object during the destination search, and for display of the at least a portion of the destination object at a graphical interface on a display of the navigation device, wherein the at least one destination point is additionally represented with at least one corresponding graphic indicative of the at least one destination point.

17. A navigation device comprising an apparatus configured to generate, during a map data compilation process, addressable database objects for route calculation by a navigation device to geographical areas, the apparatus comprising:
- an interface to a map database including at least area objects, wherein each area object is associated with an area name and a polygon representative of a geographical area; and
- a processor configured to:
- retrieve, during the map data compilation process, at least one area object from the map database;
- determine, during the map data compilation process and based on the polygon associated with the retrieved area object, at least one destination point for route guidance to the geographical area;
- generate, during the map data compilation process, a point object including the area name of the retrieved area object and the at least one destination point;
- make, during the map data compilation process, the point object, or a database object derived therefrom, a destination object for being addressed by the area name during a destination search;
- retrieve the at least one destination point expanded from the destination object during the destination search; and
- transmit at least a portion of the destination object to a display of the navigation device for display at a graphical interface, wherein the at least one destination point is additionally represented with at least one corresponding graphic indicative of the at least one destination point.

18. The navigation device of claim 17, further comprising a destinations database with a destination object corresponding to the point object, wherein the destinations object in the destinations database has an object format that is searchable during a name search.

* * * * *